Figure 10:
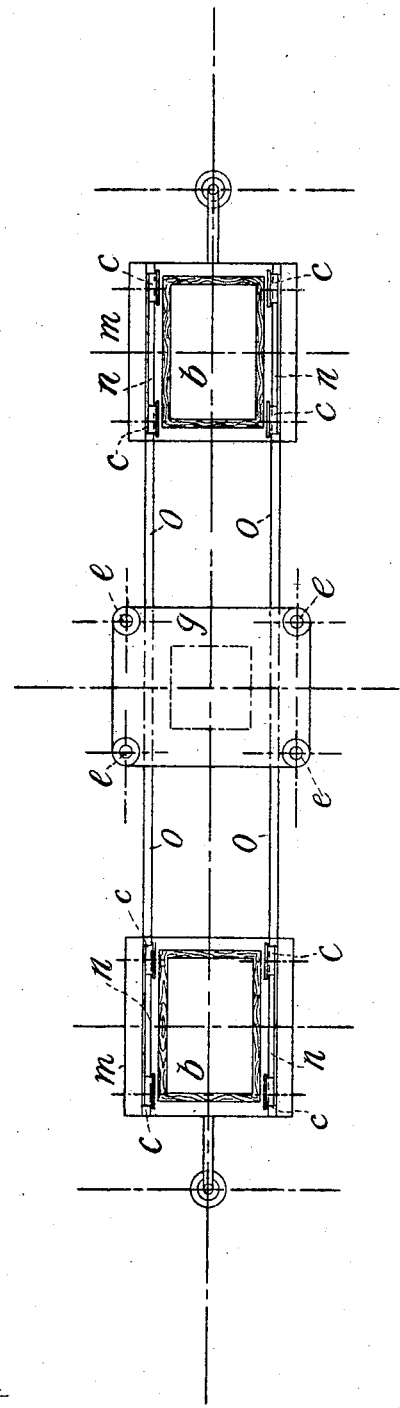

No. 876,553.  
PATENTED JAN. 14, 1908.  
J. A. HUTTON & W. H. HIMBURY.  
BALING PRESS.  
APPLICATION FILED SEPT. 7, 1907.  
5 SHEETS—SHEET 1.
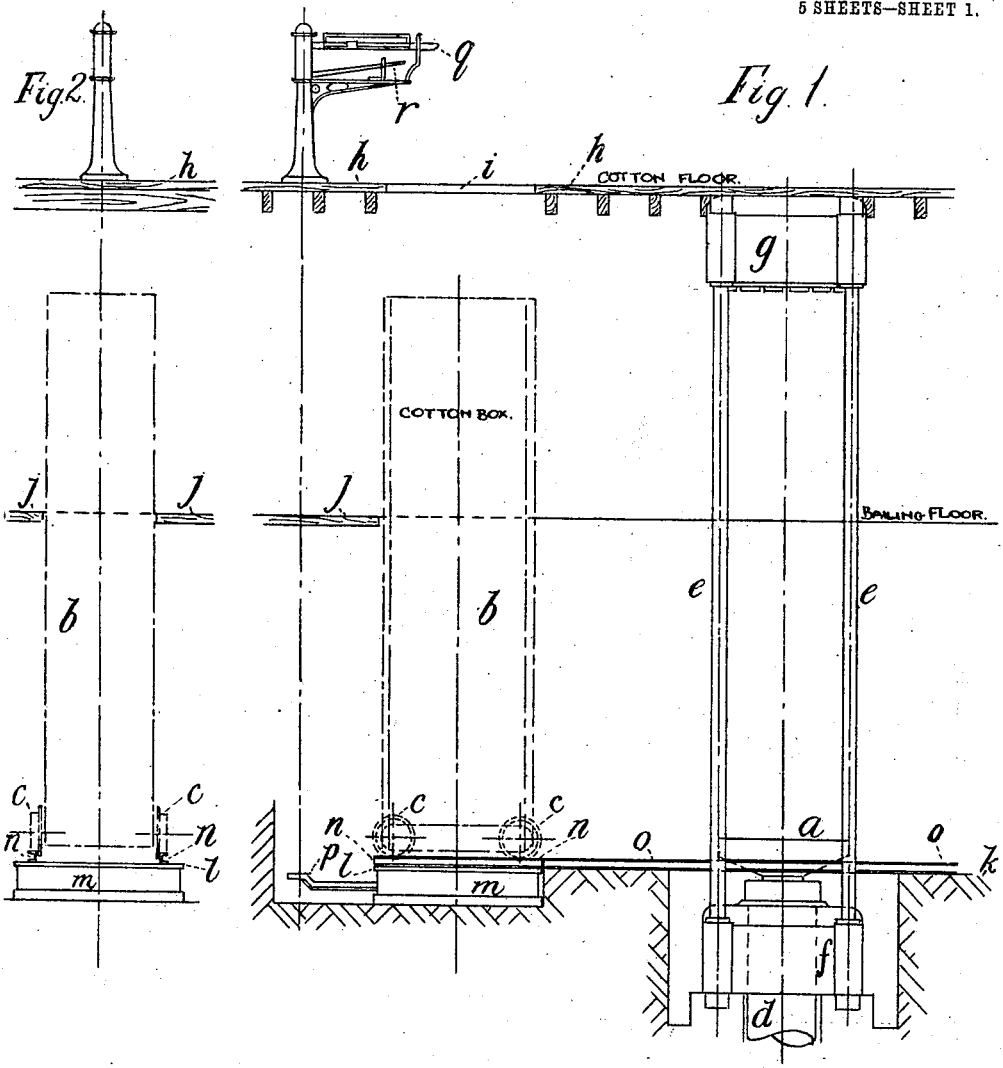
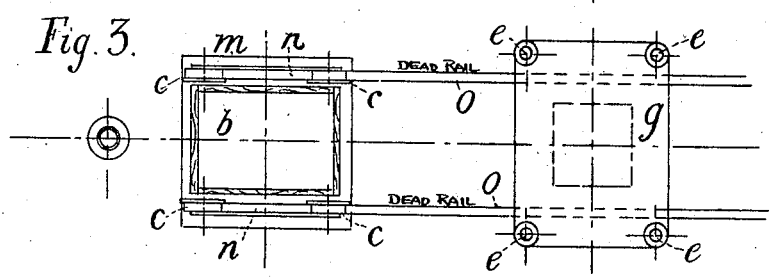
Witnesses:—  
Henry Thiene.  
F. George Barry.
Inventors:—  
James Arthur Hutton  
Wm Henry Himbury  
By Brown &c  
their Attorneys No. 876,553. PATENTED JAN. 14, 1908.
J. A. HUTTON & W. H. HIMBURY.
BALING PRESS.
APPLICATION FILED SEPT. 7, 1907.
5 SHEETS—SHEET 2.
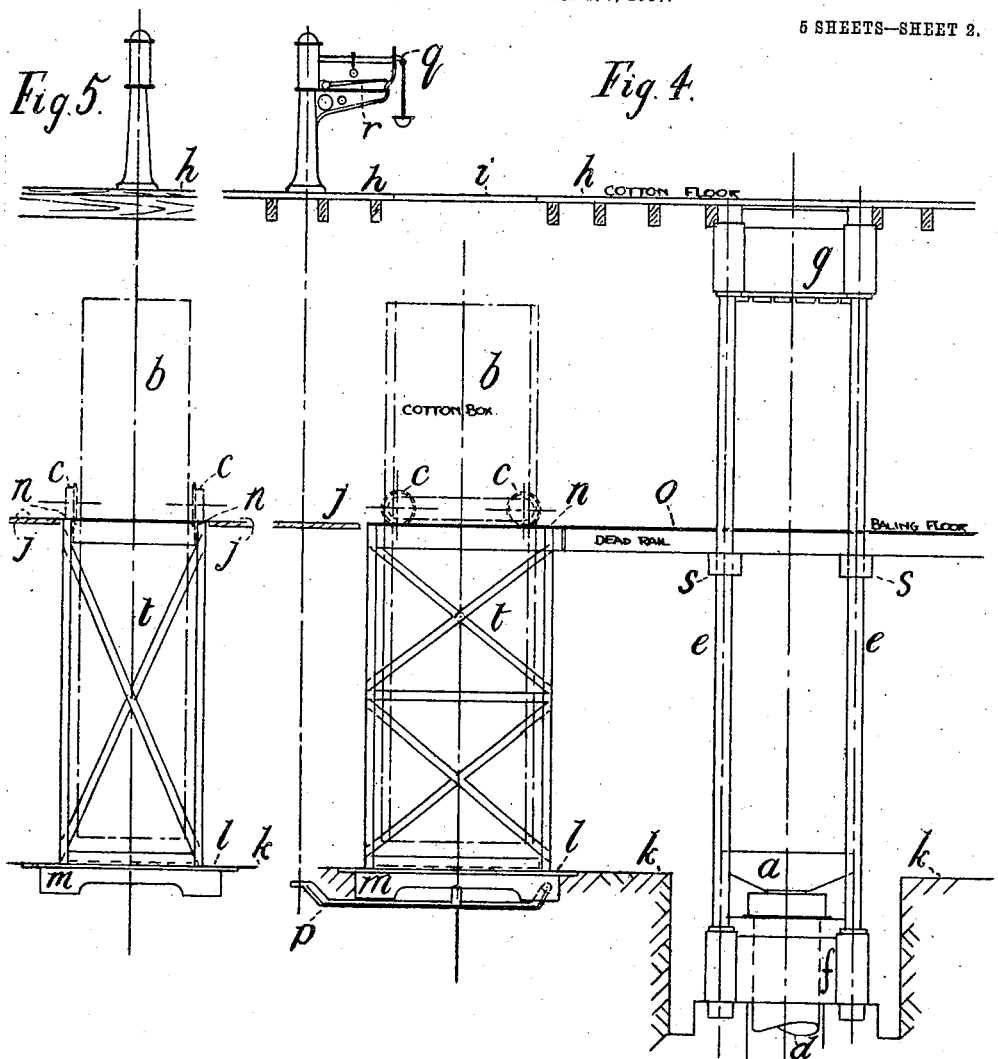
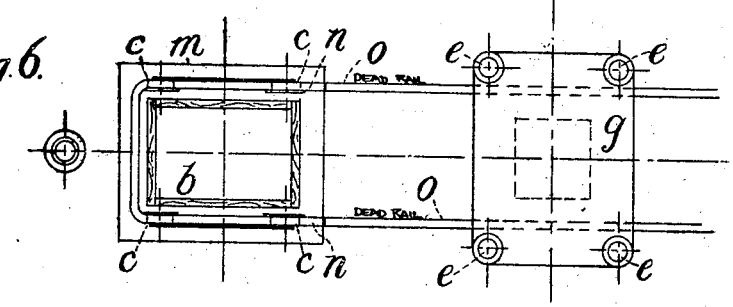

No. 876,553. PATENTED JAN. 14, 1908.
J. A. HUTTON & W. H. HIMBURY.
BALING PRESS.
APPLICATION FILED SEPT. 7, 1907.
5 SHEETS—SHEET 3.
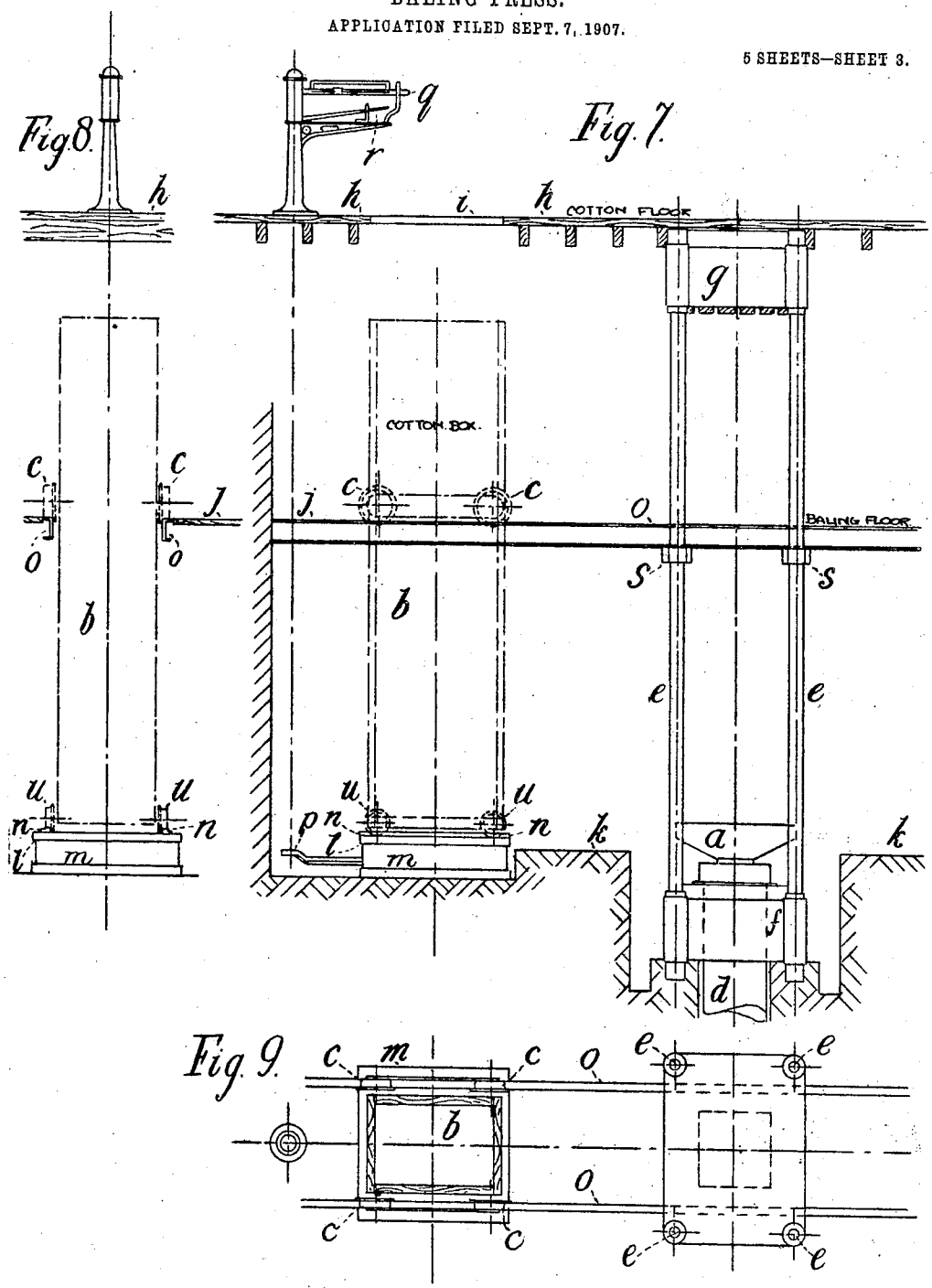

No. 876,553. PATENTED JAN. 14, 1908.
J. A. HUTTON & W. H. HIMBURY.
BALING PRESS.
APPLICATION FILED SEPT. 7, 1907.

5 SHEETS—SHEET 4.

Witnesses:-
Henry Thiene
F. George Barry.

Inventors:-
James Arthur Hutton
Wm Henry Himbury
By Brown&Darby
their Attorneys

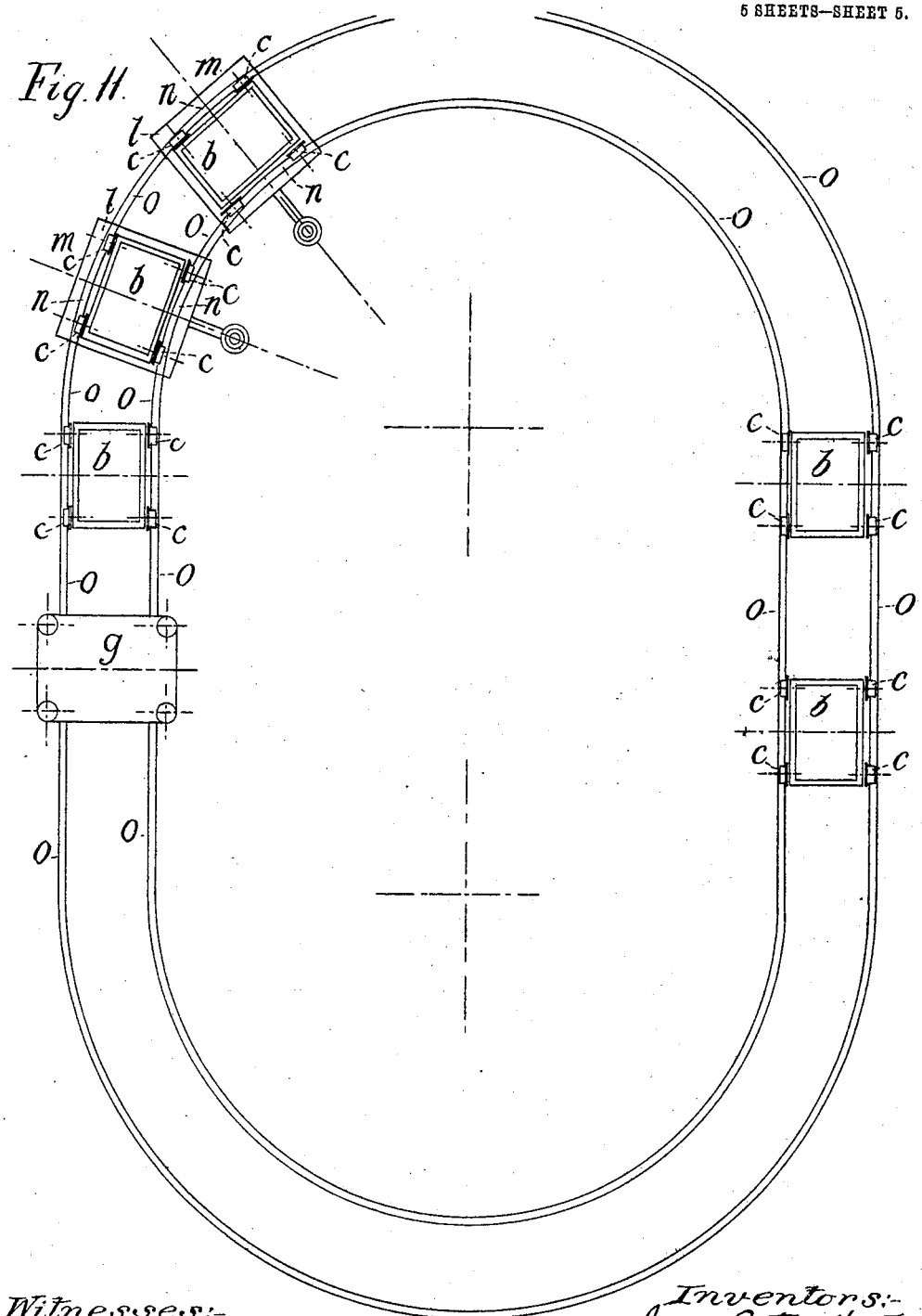

UNITED STATES PATENT OFFICE.

JAMES ARTHUR HUTTON, OF WOODLANDS, AND WILLIAM HENRY HIMBURY, OF SPRINGFIELD, CHEADLE, ENGLAND.

BALING-PRESS.

No. 876,553.  Specification of Letters Patent.  Patented Jan. 14, 1908.

Application filed September 7, 1907. Serial No. 391,767.

*To all whom it may concern:*

Be it known that we, JAMES ARTHUR HUTTON, gentleman, a subject of the King of the United Kingdom of Great Britain and Ireland, and resident of Woodlands, Alderley Edge, in the county of Chester, England, and WILLIAM HENRY HIMBURY, gentleman, a subject of the King of the United Kingdom of Great Britain and Ireland, and resident of Springfield, Cheadle, in the county of Chester, England, have invented a new and useful Improvement in Connection with Baling-Presses, of which the following is a specification.

Our invention relates to improvements in connection with the means for feeding and filling the boxes of baling-presses whereby the contents may be accurately regulated or ascertained.

In existing presses where the press-boxes are traveled on rails into positions for filling and pressing, the material to be pressed is measured or weighed and afterwards is filled into the press-box. The object of our improvements is to dispense with the necessity of the usual measuring and weighing and to feed the material direct into the press-box.

In carrying this improvement into effect, we divide the rails or plates upon which the press-box travels and arrange a weighing machine in any convenient manner in connection with that portion of the rails or plates which supports the press-box when it is in position for filling. The steelyard or indicator may be arranged on the cotton filling floor and may be fitted with a gong or counter.

The weight of the bale having been decided upon, the press-box is filled automatically or otherwise until the weight is indicated after which the supply is stopped, and the box is traveled from that portion of the rails on which it has been weighed into the press to be afterwards pressed and baled. By this means a greater production is obtained. All the bales are made the same weight. The bagging and ties can all be made one size. The weight of the box or tare will be accounted for on the steelyard or indicator and the weight of the ties allowed for. Where two or more press-boxes are used two or more weighing machines may be employed.

In the accompanying drawings in all the figures of which the same letters of reference are employed to indicate corresponding parts, five methods of employing this invention are illustrated diagrammatically and by way of example, and to simplify and to facilitate the description of the drawings, the baling presses illustrated will be described as used for baling cotton although they are also applicable for baling other loose materials.

Figure 1 is a side elevation partly in vertical section showing a baling press and rails and a press-box and mechanism used therewith sufficiently for the illustration of one way of carrying this invention into effect. Fig. 2 is an end elevation partly in vertical section of part of the apparatus shown in Fig. 1. Fig. 3 is a plan partly in horizontal section of the apparatus shown in Figs. 1 and 2. Fig. 4 is a side elevation partly in vertical section showing a baling press and rails and a press-box and mechanism used therewith sufficiently for the illustration of a second way of carrying this invention into effect. Fig. 5 is an end elevation partly in vertical section of part of the apparatus shown in Fig. 4 and Fig. 6 is a plan partly in horizontal section of the apparatus shown in Figs. 4 and 5. Fig. 7 is a side elevation partly in vertical section showing a baling press and rails and a press-box and mechanism used therewith sufficiently for the illustration of a third way of carrying this invention into effect. Fig. 8 is an end elevation partly in vertical section of part of the apparatus shown in Fig. 7 and Fig. 9 is a plan partly in horizontal section of the apparatus shown in Figs. 7 and 8. Fig. 10 is a plan partly in horizontal section illustrating one method of employing two press-boxes with one press in accordance with this invention. Fig. 11 is a plan illustrating one method of employing a number of press-boxes with one press in accordance with this invention.

Figs. 1, 2 and 3 illustrate a baling press in which the press-box to receive material to be pressed is provided at its lower part with wheels made to travel upon rails or plates and the portion of the rails or plates on which the press-box is supported when in position for filling is formed or mounted on the table of a weighing machine on the same or approximately the same level as the portion of the rails or plates on which the press-box is made to travel to and from the table of the press.

Figs. 4, 5 and 6 illustrate a baling-press in which the press-box is furnished with wheels above its center so as to be as it were suspended from the rails or plates on which it travels to and from the table of the press and the portion of the rails or plates by which it is supported when in position for filling is carried by a structure erected upon the table of a weighing machine. Figs. 7, 8 and 9 illustrate a baling press in which the press-box is furnished with wheels above its center, so as to be as it were suspended from the rails or plates on which it travels to and from the table of the press and the portion of the rails or plates by which it is supported when in position for filling is formed upon the table of a weighing machine at a lower level than the rails or plates on which the press-box is made to travel to and from the table of the press.

In the baling press shown in Figs. 1, 2 and 3, $a$ is the table of the baling press, $b$ is the press-box and $c\ c$ are wheels provided on its lower part. $d$ is the cylinder of the baling-press and $e\ e$ are the columns connecting the base $f$ and head $g$ of the press and serving also to support the head $g$. $h$ is the cotton filling floor on which the cotton to be formed into bales is stored and $i$ is a hole in the cotton filling floor $h$ through which cotton may be passed into the press-box beneath. $j$ is the baling floor on which work the attendants applying the bale-ties and removing the completed bales from the press-box $b$ and $k$ is the lower floor or basement in which the press-cylinder $d$ and the table $l$ and the other lower parts of a weighing machine $m$ are placed.

In the baling-press shown in Figs. 1, 2 and 3 the rails or plates on which the press-box $b$ is made to rest by means of the wheels $c$ provided on its lower part, are divided into two portions, one marked $n$ to support the press-box when it is in position for filling and the other marked $o$ to enable the press-box $b$ to be moved to and away from the press-table $a$ with which it is to be used.

In the part $o$ the rails or plates are laid and supported in any suitable way to extend from the table $a$ of the press nearly to the position in which the press-box $b$ is to be placed for filling and in the opposite direction for any convenient distance. In the part $n$ the rails or plates are laid upon the table $l$ of the weighing machine which, as is usual in weighing machines, is adapted to be supported in use by a lever $p$ and this lever $p$ is connected in any suitable way to a steelyard or indicator $q$ mounted on the cotton-filling-floor $h$ from which cotton is supplied through the hole $i$ therein to the press-box $b$ so that the steelyard or indicator $q$ mounted on the cotton-filling-floor $h$ may be used to indicate the weight borne by the table $l$ from time to time in use.

In the use of the apparatus shown in Figs. 1, 2 and 3, the press-box $b$ is moved into position to be supported by the part $n$ of the rails or plates while the table $l$ of the weighing machine is supported by the fixed supports provided as is usual in weighing machines and then the hand-lever $r$ of the steelyard or indicator $q$ is moved into position to cause the table $l$ and the part $n$ of the rails and the box $b$ thereon to be supported by the lever $p$ and the box $b$ while remaining supported by the lever $p$ is filled with cotton from the floor $h$ until the steelyard or indicator $q$ shows that the requisite quantity of cotton has been placed in the press-box $b$.

When the requisite quantity of cotton has been placed in the press-box $b$ the hand-lever $r$ used with the steelyard or indicator $q$ is released so that the table $l$ may be again supported by the fixed supports aforesaid and the press-box $b$ is moved along the rails or plates into the proper position over the table $a$ so that the table $a$ of the press may be made to compress the cotton in the press-box $b$ to the required size and when the formation of a bale has been completed in the ordinary manner and the bale has been removed from the press-box $b$ the press-box $b$ is moved back along the rails into position to be again filled with cotton and operations are continued in the manner hereinbefore described, the hand-lever $r$ being moved from time to time to put the steelyard or indicator $q$ into and out of action.

In the baling apparatus illustrated in Figs. 4, 5 and 6 the rails or plates on which the wheels $c\ c$ of the press-box $b$ are made to roll are supported as to the part $o$ at or approximately at the level of the baling floor $j$ in any suitable way as for example by means of brackets $s$ attached to the columns $e$ of the press and as to the part $n$ on a framework or braced structure $t$ erected on and secured to the table $l$ of the weighing machine $m$ and of such height that the part $n$ of the rails or plates shall be at the same level as or slightly above the level of the part $o$ of such rails or plates when the press-box $b$ is empty and the steelyard or indicator $q$ is in use, so that the descent of the table $l$ of the weighing machine $m$ caused by the filling of the press-box $b$ or the release of the hand-lever $r$ of the steelyard or indicator $q$ shall bring the upper surfaces of the part $n$ of the rails or plates to the same level as the upper surfaces of the part $o$ of the rails or plates. Except in that the wheels $c\ c$ of the press-box $b$ are made to travel upon the rails at the level of the baling floor $j$, the use of the apparatus illustrated in Figs. 4, 5 and 6 is similar to that of the apparatus illustrated in Figs. 1, 2 and 3.

In the apparatus illustrated by Figs. 7, 8 and 9 the rails or plates on which the press-box $b$ is made to travel and be supported consist, as to the part o, of rails or plates supported at the level of the baling floor j and provided in order that the press-box b may be moved to and from the filling position and, as to the part n of the rails on which the press-box b is supported while being filled and while its contents are weighed, of rails or plates laid and secured on the table l of a weighing machine m nearer to the lower floor k than the baling-floor j and the press-box b is provided with wheels u to bear upon the part n of the rails or plates when the press-box b is brought into position for being filled, the usual operation of the hand-lever r of the steelyard or indicator q to put the steelyard or indicator q into action serving to bring the part n of the rails or plates beneath the wheels u and to relieve the wheels c c for the time being of the duty of supporting the press-box b.

In all respects other than those herein mentioned the use of the baling-press illustrated in Figs. 7, 8 and 9 is similar to that of the baling presses illustrated in Figs. 1, 2 and 3 and Figs. 4, 5 and 6.

The application of a gong or counter in conjunction with a steelyard or indicator employed according to this invention will be readily understood and carried into effect without further description herein and the use of two or more weighing machines in conjunction with two or more press-boxes used with one press will be readily understood and carried into effect by the aid of the diagrams given in Figs. 10 and 11 of the accompanying drawings. Fig. 10 shows a press placed between the weighing machines on which two boxes are supported when they are respectively being filled and indicates clearly that the rails or plates employed forming two tracks at opposite sides of the press may be arranged in any of the ways illustrated in Figs. 1, 2 and 3, Figs. 4, 5 and 6 and Figs. 7, 8 and 9.

Fig. 11 shows a press placed at a convenient position in a system of rails or plates forming substantially an endless track so that press-boxes may be moved to and from such press from or to either of the two weighing machines shown, in either one direction or the other around the track as may be convenient from time to time and indicates clearly that the rails or plates employed may be arranged in any of the ways illustrated in Figs. 1, 2 and 3, Figs. 4, 5 and 6 and Figs. 7, 8 and 9, and also how if one of the two weighing machines be put out of action or dispensed with, the rails in the latter case being correspondingly arranged, one press and weighing machine may be used with two or more boxes.

The description herein given and inspection of the accompanying drawings will suffice to show clearly that the provision of a weighing machine in connection with the part of the rails or plates used with the press-box of a baling press when in position to be filled renders it unnecessary that cotton or other loose material to be formed into bales should be weighed as hitherto before being placed in a press-box, and obviates the waste of time, trouble and expense involved by the separate weighing in the process of weighing and baling of cotton and other loose materials and thus with one press a greater number of bales can be made and completed in the time available than would be possible in the methods and apparatus hitherto used and provided, and as it is easy to allow in a steelyard or indicator or the weights applied thereto for the weight of a press-box, the employment of this invention makes it very easy to ascertain the exact weight of cotton or other loose material formed into a bale and to make successive bales of equal weight and size and as the bagging or other covering and bale-ties applied to bales can also be made alike in weight for each of a number of successive bales by bagging or other covering and bale-ties being made of the same size for each bale, it is easy to allow for the weight of the bagging or other covering and bale-ties either in the steel-yard or indicator or in the weights applied thereto or in the record made regarding the bales and in all these ways losses of time, trouble and expense hitherto experienced are obviated.

What we claim as our invention and desire to secure by Letters Patent is:—

The combination of a baling press, a press-box to be used in such baling-press and adapted to be moved on rails into position for filling and for the pressing of materials therein, rails divided into parts of which one serves for the movement of the press-box to and from the press from and to a weighing machine and another serves to support the press-box when in position for filling, a weighing machine in connection with the part of the rails used to support the press-box in position for filling and an indicator in connection with such weighing machine whereby materials to be pressed can be weighed in the press-box, substantially as hereinbefore described.

In testimony, that we claim the foregoing as our invention, we have signed our names in presence of two witnesses, this twenty-sixth day of August, 1907.

JAMES ARTHUR HUTTON.
WILLIAM HENRY HIMBURY.

Witnesses:
EDWARD HAROLD OLDFIELD,
ARTHUR LEECH KNOWLSON